US009956861B2

(12) United States Patent
Nomura et al.

(10) Patent No.: US 9,956,861 B2
(45) Date of Patent: May 1, 2018

(54) FRAMEWORK STRUCTURE OF BODY-ON-FRAME VEHICLE

(71) Applicants: TOYOTA JIDOSHA KABUSHIKI KAISHA, Toyota-shi (JP); TOYOTA SHATAI KABUSHIKI KAISHA, Kariya-shi (JP)

(72) Inventors: Kenta Nomura, Nagoya (JP); Hideo Kajino, Niwa-gun (JP)

(73) Assignees: TOYOTA JIDOSHA KABUSHIKI KAISHA, Toyota-shi (JP); TOYOTA SHATAI KABUSHIKI KAISHA, Kariya-shi (JP)

( * ) Notice: Subject to any disclaimer, the term of this patent is extended or adjusted under 35 U.S.C. 154(b) by 0 days. days.

(21) Appl. No.: 15/379,822

(22) Filed: Dec. 15, 2016

(65) Prior Publication Data
US 2017/0217296 A1  Aug. 3, 2017

(30) Foreign Application Priority Data
Feb. 2, 2016  (JP) ................................. 2016-017964

(51) Int. Cl.
*B60K 1/04* (2006.01)
*B62D 23/00* (2006.01)
(Continued)

(52) U.S. Cl.
CPC .................. *B60K 1/04* (2013.01); *B60K 6/28* (2013.01); *B60R 19/02* (2013.01); *B62D 21/152* (2013.01);
(Continued)

(58) Field of Classification Search
CPC ...... B60K 1/04; B60K 1/0405; B60K 1/0433; B60K 1/0435; B60K 6/28;
(Continued)

(56) References Cited

U.S. PATENT DOCUMENTS

| 5,501,289 A * | 3/1996 | Nishikawa | ............... B60K 1/04 |
| | | | 180/65.1 |
| 7,051,825 B2 * | 5/2006 | Masui | ...................... B60K 1/04 |
| | | | 180/65.1 |

(Continued)

FOREIGN PATENT DOCUMENTS

| JP | 06-344953 A | 12/1994 |
| JP | 2013-169814 | 9/2013 |

*Primary Examiner* — John D Walters
(74) *Attorney, Agent, or Firm* — Oblon, McClelland, Maier & Neustadt, L.L.P.

(57) ABSTRACT

A framework structure of a body-on-frame vehicle, the framework structure comprises a first framework, a second framework, and a battery. The first framework includes: a pair of left and right side rails extending in a vehicle body front-and-rear direction, a first cross-member and a second cross-member, both extending in a vehicle body left-and-right direction and linking the side rails. The second framework is structured in a rectangular shape in plan view and includes: a front cross portion and a rear cross portion that are formed in chamber shapes and extend in the vehicle body left-and-right direction, and a left side cross portion and a right side cross portion that are formed in chamber shapes and extend in the vehicle body front-and-rear direction. The battery is disposed in a cavity surrounded by the first framework and the second framework.

5 Claims, 7 Drawing Sheets

(51) Int. Cl.
*B62D 21/15* (2006.01)
*B60R 19/02* (2006.01)
*B60K 6/28* (2007.10)
*B62D 25/20* (2006.01)

(52) U.S. Cl.
CPC ......... *B62D 21/157* (2013.01); *B62D 23/005* (2013.01); *B62D 25/2009* (2013.01); *B60K 2001/0433* (2013.01); *B60Y 2200/91* (2013.01); *B60Y 2200/92* (2013.01); *B60Y 2306/01* (2013.01); *B60Y 2410/124* (2013.01); *Y10S 903/907* (2013.01)

(58) Field of Classification Search
CPC ............ B60K 2001/0433; B60R 19/02; B62D 21/152; B62D 21/157; B62D 23/005; B62D 25/2009
USPC ....................................................... 180/68.5
See application file for complete search history.

(56) References Cited

U.S. PATENT DOCUMENTS

| | | | |
|---|---|---|---|
| 7,614,473 B2* | 11/2009 | Ono | B60K 1/04 180/291 |
| 9,027,684 B2* | 5/2015 | Araki | B60K 1/04 180/311 |
| 9,227,582 B2* | 1/2016 | Katayama | B60K 1/04 |
| 9,283,838 B2* | 3/2016 | Ohashi | B60K 1/04 |

\* cited by examiner

FRAMEWORK STRUCTURE OF BODY-ON-FRAME VEHICLE

CROSS-REFERENCE TO RELATED APPLICATION

This application claims priority under 35 USC 119 from Japanese Patent Application No. 2016-17964 filed Feb. 2, 2016, the disclosure of which is incorporated by reference herein in its entirety.

BACKGROUND

Technical Field

Preferred embodiments relate to a framework structure of a body-on-frame vehicle.

Related Art

A vehicle body rear portion structure has been known since heretofore, for example, see Japanese Patent Application Publication No. 2013-169814 in which the two end portions of a cross-member that extends in a vehicle width direction are joined to a left and right pair of rear side members, and a battery unit surrounded by frame members is disposed at a vehicle body rear side of the cross-member.

SUMMARY

However, because the cross-member whose two end portions are joined to the left and right pair of rear side members is not disposed at the vehicle body rear side of the battery unit surrounded by the frame members, it may be difficult to protect the battery unit when the vehicle is in a rear face collision. Thus, there is still a room for improvement of a structure that protects a battery unit (a battery) in a collision of a vehicle (a body-on-frame vehicle).

In consideration of the above circumstances, an object of preferred embodiments is to provide a framework structure of a body-on-frame vehicle in which a battery is installed, which framework structure may protect the battery whether a load is applied to the body-on-frame vehicle in a vehicle body front-and-rear direction, a vehicle width direction or the like.

A framework structure of a body-on-frame vehicle of a first aspect of the disclosure includes: a first framework, a second framework, and a battery. The first framework includes a pair of left and right side rails extending in a vehicle body front-and-rear direction, a first cross-member extending in a vehicle body left-and-right direction and linking the side rails, and a second cross-member extending in the vehicle body left-and-right direction at a vehicle body rear side of the first cross-member and linking the side rails. The second framework is structured in a rectangular shape in plan view, and includes a front cross portion and a rear cross portion that are formed in chamber shapes and that extend in the vehicle body left-and-right direction, and a left side cross portion and a right side cross portion that are formed in chamber shapes and that extend in the vehicle body front-and-rear direction. The battery is disposed in a cavity surrounded by the first framework and the second framework.

According to the framework structure of the first aspect, the battery is disposed in the cavity surrounded by the first framework and the second framework. The first framework includes the first cross-member, the second cross-member and the pair of left and right side rails, and the second framework includes the front cross portion, the rear cross portion, the left side cross portion and the right side cross portion. Therefore, in the body-on-frame vehicle in which the battery is installed and that includes the first framework, the battery is protected whether a load is applied in the vehicle body front-and-rear direction, the vehicle body left-and-right direction or the like.

A framework structure of a body-on-frame vehicle of a second aspect of the disclosure includes the framework structure of a body-on-frame vehicle of the first aspect, wherein the front cross portion and the rear cross portion are linked together, at vehicle body left-and-right direction inner sides relative to the left side cross portion and the right side cross portion, by a pair of left and right braces that extend in the vehicle body front-and-rear direction, and a gutter portion that extends in the vehicle body front-and-rear direction is formed in each of the pair of left and right the braces.

According to the framework structure of the second aspect, the front cross portion and the rear cross portion are linked together, at the vehicle body left-and-right direction inner sides relative to the left side cross portion and the right side cross portion, by the pair of left and right braces that extend in the vehicle body front-and-rear direction. The gutter portions that extend in the vehicle body front-and-rear direction are formed in the braces. Therefore, strength of the braces is improved and load withstand performance with respect to loads applied in the vehicle body front-and-rear direction is improved.

A framework structure of a body-on-frame vehicle of a third aspect of the disclosure includes the framework structure of a body-on-frame vehicle of the second aspect, wherein seat mounting portions for mounting a seat are provided at the pair of left and right braces.

According to the framework structure of the third aspect, the seat mounting portions that are configured to mount a seat are provided at the pair of left and right braces whose strength is improved. Therefore, there is no need to provide separate high-strength members for mounting seat mounting portions, and a number of components may be reduced.

A framework structure of a body-on-frame vehicle of a fourth aspect of the disclosure includes the framework structure of a body-on-frame vehicle of the third aspect, wherein the gutter portions of the left-and-right braces are each formed by a floor face and side faces, and position regulation portions that regulate positions of the seat mounting portions in the vehicle body front-and-rear direction are formed at the side faces.

According to the framework structure of the fourth aspect, the position regulation portions that regulate the positions of the seat mounting portions in the vehicle body front-and-rear direction are formed at the side faces of the gutter portions of the braces. Therefore, a withstand load performance with respect to loads applied to the seat mounting portions in the vehicle body front-and-rear direction is improved with a simple structure.

A framework structure of a body-on-frame vehicle of a fifth aspect of the disclosure includes the framework structure of a body-on-frame vehicle of any of the first to fourth aspects and further includes a floor panel that is disposed at a vehicle body upper side of the first cross-member and the second cross-member. The front cross portion, the rear cross portion, the left side cross portion and the right side cross portion are formed into the chamber shapes by each being joined to the floor panel.

According to the framework structure of the fifth aspect, the chamber shapes are formed by the front cross portion, the rear cross portion, the left side cross portion and the right side cross portion being respectively joined to the floor panel that is disposed at the vehicle body upper side of the first cross-member and second cross-member. Therefore, the joining to form the chamber shape of the second framework may be made easier and weight may be reduced.

BRIEF DESCRIPTION OF THE DRAWINGS

Preferred embodiments will be described in detail based on the following figures, wherein.

DETAILED DESCRIPTION

Herebelow, a preferred embodiment is described in detail in accordance with the drawings. For convenience of description, the arrow UP that is shown where appropriate in the drawings indicates a vehicle body upward direction, the arrow FR indicates a vehicle body forward direction, and the arrow RH indicates a vehicle body rightward direction. In the following descriptions, where the directions up and down, front and rear, and left and right are recited without being particularly specified, the same represent up and down in the vehicle body vertical direction, front and rear in the vehicle body front-and-rear direction, and left and right in the vehicle body left-and-right direction (the vehicle width direction).

Figure 1:
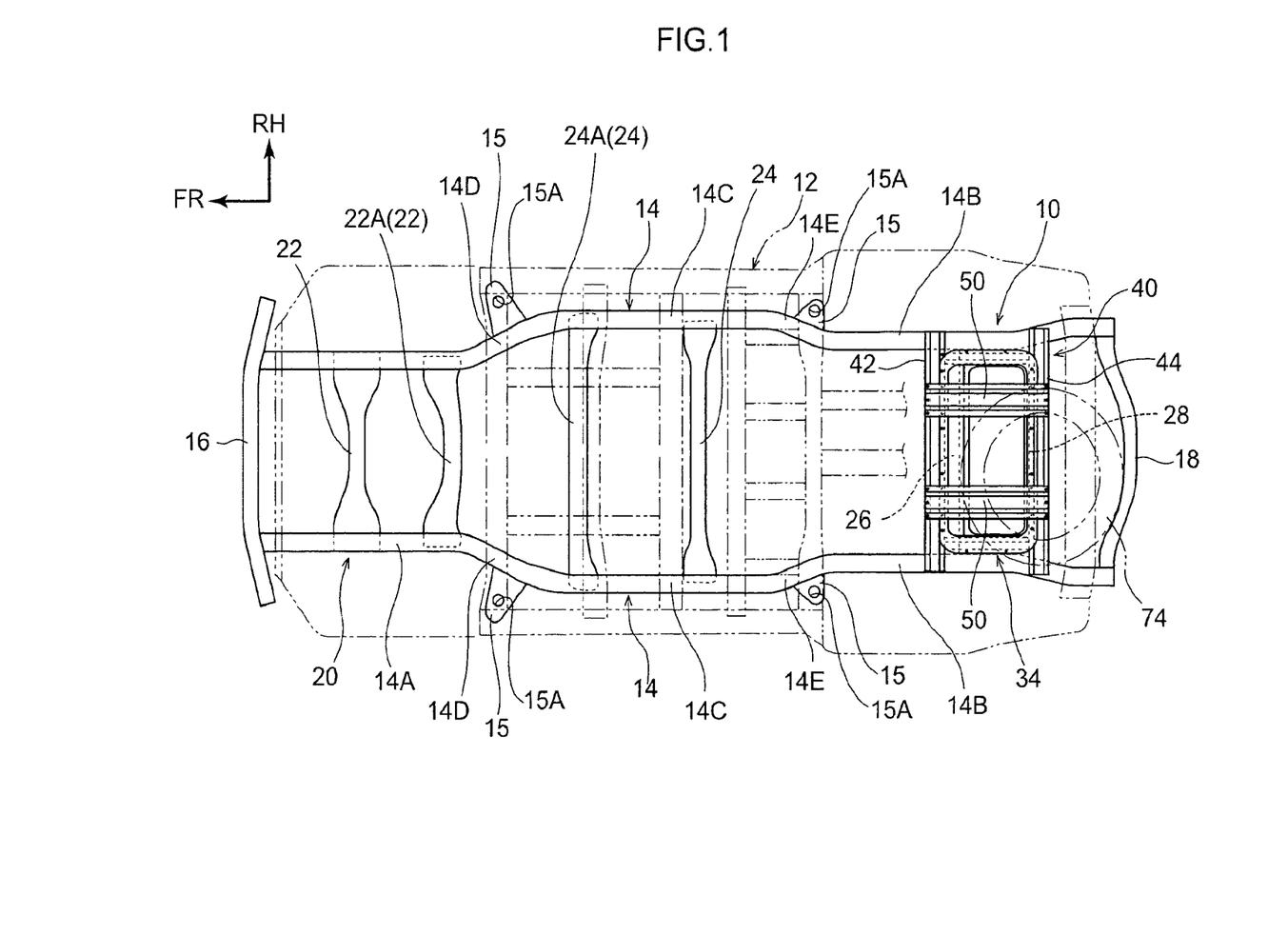
FIG. 1 is a plan view showing a framework structure of a body-on-frame vehicle in accordance with an exemplary embodiment.
Figure 2:
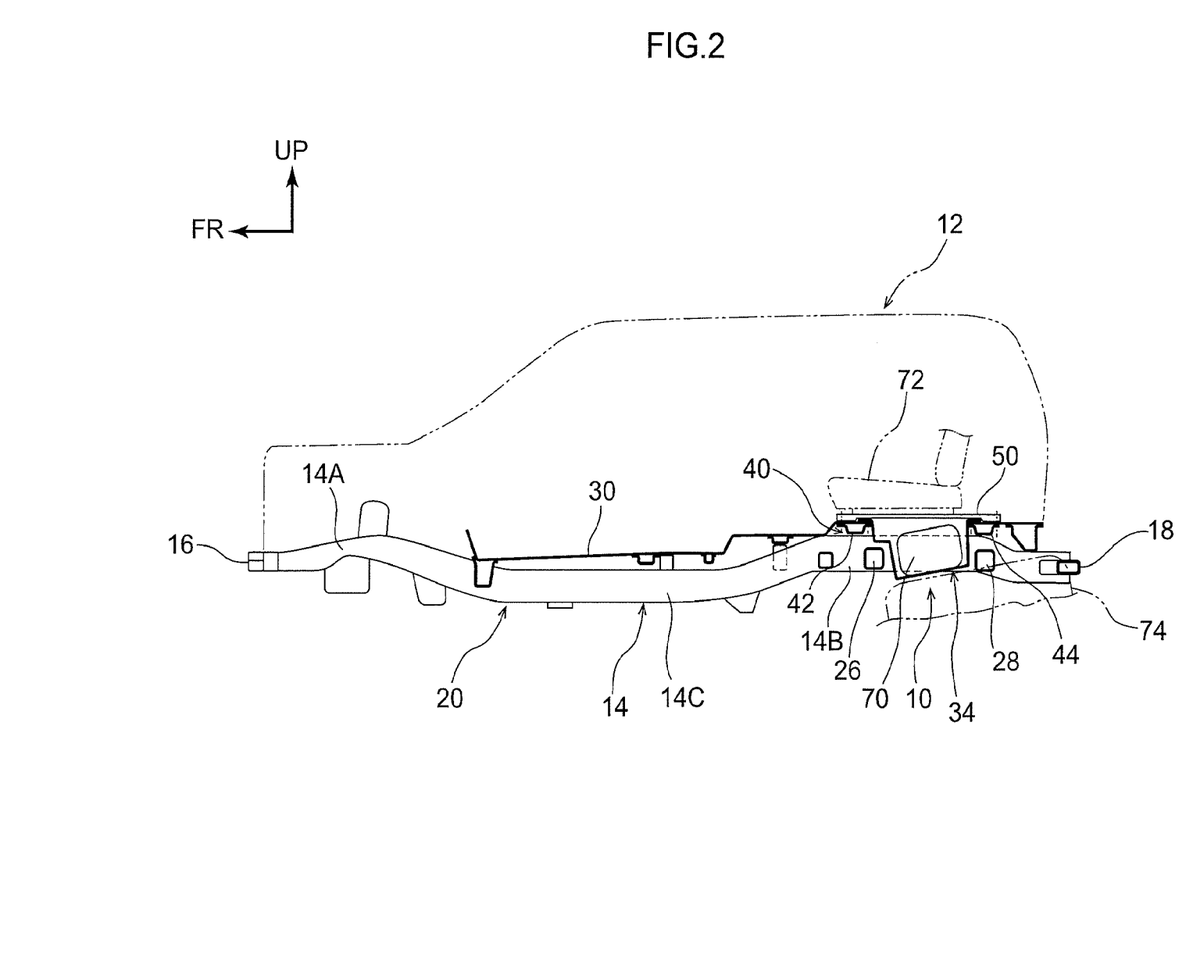
FIG. 2 is a side view showing the framework structure of the body-on-frame vehicle in accordance with the exemplary embodiment.

As shown in FIG. 1 and FIG. 2, a body-on-frame vehicle 12 equipped with a framework structure 10 according to the present exemplary embodiment is, for example, a hybrid vehicle in which an HV battery 70 is installed (see FIG. 2). The body-on-frame vehicle 12 includes a pair of left and right side rails 14 that are disposed at both sides in the vehicle width direction and that extend in the vehicle body front-and-rear direction. Front wheels and rear wheels, which are not shown in the drawings, are respectively disposed at vehicle width direction outer sides of front portions 14A and rear portions 14B of the side rails 14.

Accordingly, in order to avoid interference between the side rails 14 and the front wheels and rear wheels, a vehicle width direction dimension between the left and right side rails 14 is made shorter at the front portions 14A and the rear portions 14B than at central portions 14C of the side rails 14. That is, an angled portion 14D that is angled toward a vehicle body outer-rear side away from a vehicle body front side in a plan view is formed between the front portion 14A and central portion 14C of each side rail 14, and an angled portion 14E that is angled toward the vehicle body outer-front side away from the vehicle body rear side is formed between the rear portion 14B and central portion 14C of each side rail 14.

As shown in FIG. 2, the front portion 14A and rear portion 14B of each side rail 14 are disposed at vehicle body upper sides relative to the central portion 14C, because suspension units and the like that are not shown in the drawings are disposed at vehicle body lower sides of the front portions 14A and rear portions 14B. That is, in a side view seen in the vehicle width direction, the angled portions 14D and 14E are angled to the vehicle body upper sides with progression toward the vehicle body front side and the vehicle body rear side, respectively, from the central portions 14C of the side rails 14.

A front bumper reinforcement 16 that extends substantially in the vehicle width direction spans between front end portions of the side rails 14. A rear bumper reinforcement 18 that extends substantially in the vehicle width direction spans between rear end portions of the side rails 14. Energy-absorbing members such as crush boxes or the like, which are not shown in the drawings, are provided between the front end portions of the side rails 14 and the front bumper reinforcement 16 and between the rear end portions of the side rails 14 and the rear bumper reinforcement 18.

Between the front bumper reinforcement 16 and the rear bumper reinforcement 18, plural cross-members 22, 24, 26 and 28 that extend in the vehicle width direction span between the pair of left and right side rails 14. More specifically, two cross-members 22 span between the front portions 14A of the left and right side rails 14 so as to link the front portions 14A, and two cross-members 24 span between the central portions 14C of the left and right side rails 14 so as to link the central portions 14C.

The first cross-member 26, at a front side, and the second cross-member 28, at a rear side, span between the rear portions 14B of the left and right side rails 14 so as to link the rear portions 14B. Thus, a framework 20 (a first frame work) in a ladder shape is formed in the body-on-frame vehicle 12 by the cross-members 22, 24, 26 and 28 and the left and right side rails 14.

As shown in FIG. 1, of the cross-members 22 spanning between the front portions 14A, a cross-member 22A that is at the rear side spans between inflection portions at front end portions of the angled portions 14D. Of the cross-members 24 spanning between the central portions 14C, a cross-member 24A that is at the front side spans between inflection portions at rear end portions of the angled portions 14D. Thus, a structure is formed in which the front ends and rear ends, that are inflection portions, of the angled portions 14D are effectively reinforced.

Cab mount brackets 15 that protrude to respective vehicle width direction outer sides are provided at the angled portions 14D and 14E of the side rails 14. Mounting holes 15A for mounting cab mounts, which are not shown in the drawings, are formed in the cab mount brackets 15. A cab (body) that is not shown in FIG. 1 is mounted to the side rails 14 via the cab mount brackets 15 and the cab mounts.

In the body-on-frame vehicle 12 that includes the framework 20 as described above, the HV battery 70 for a hybrid vehicle (see FIG. 2) is installed at a rear portion 14B side of the side rails 14. Now, the framework structure 10 according to the present exemplary embodiment that may protect the HV battery 70 is described in detail.

Figure 4:
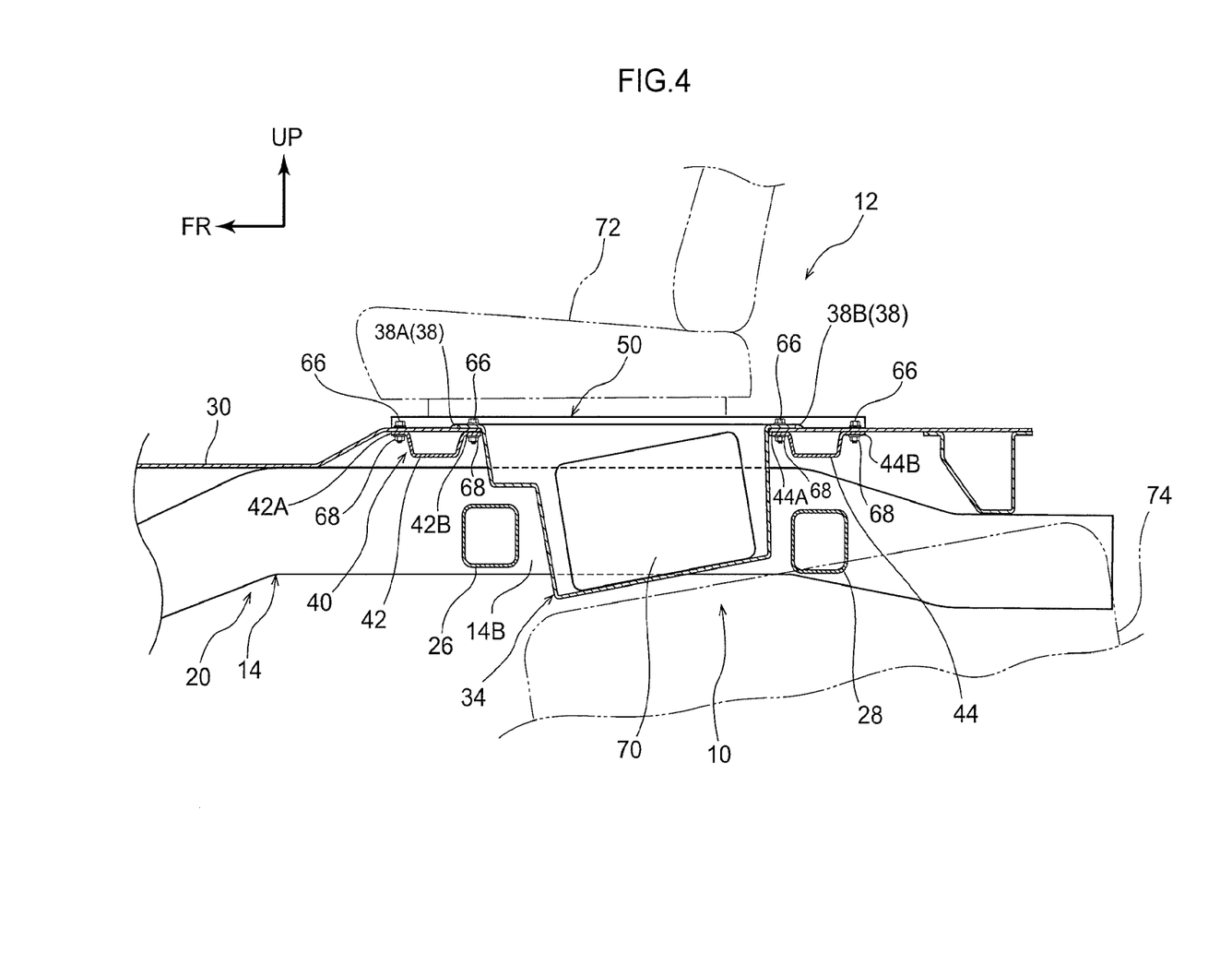
FIG. 4 is a side view showing a magnification of the principal portions of the framework structure of the body-on-frame vehicle in accordance with the exemplary embodiment.
Figure 5:
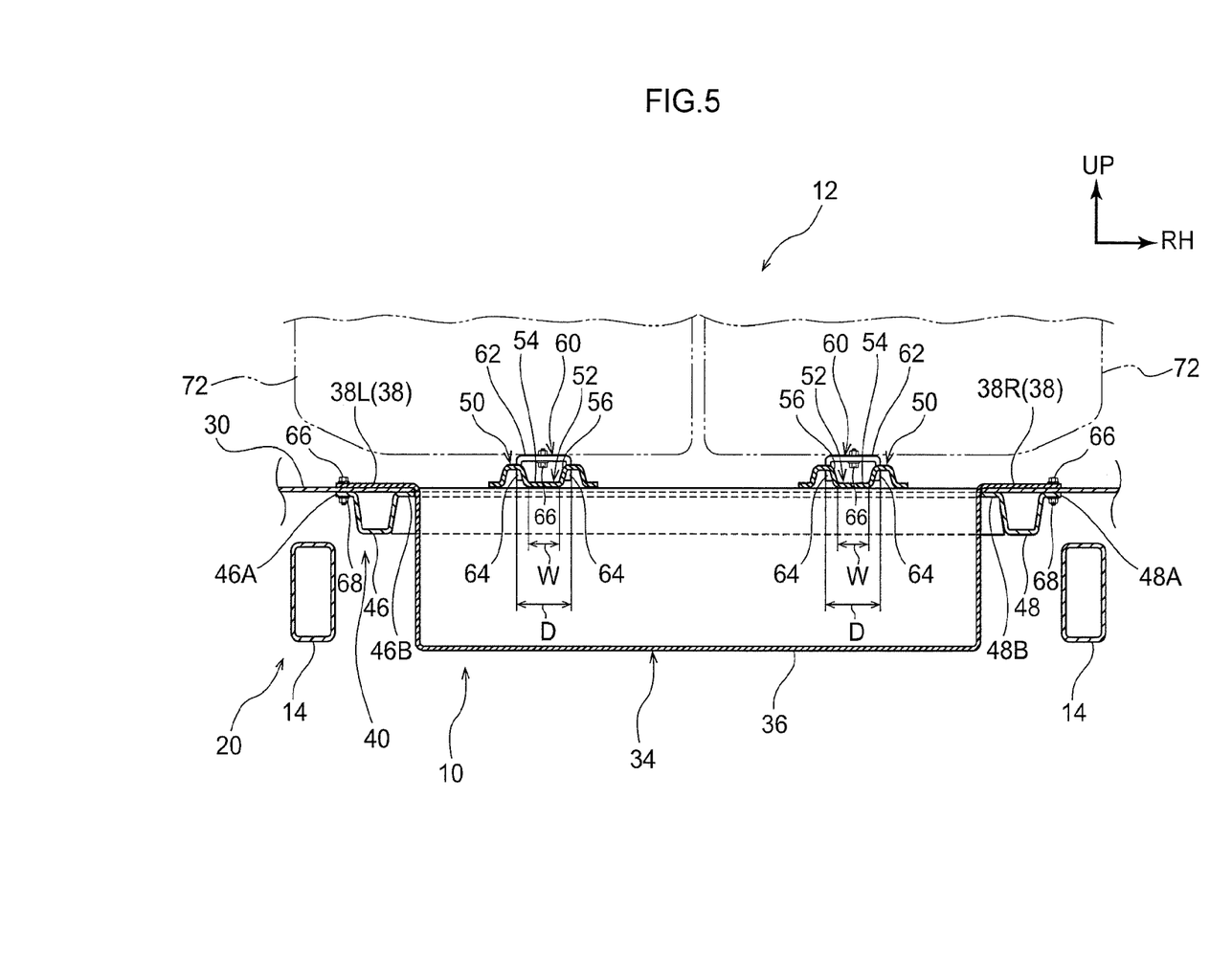
FIG. 5 is a rear view showing a magnification of the principal portions of the framework structure of the body-on-frame vehicle in accordance with the exemplary embodiment.
Figure 6:
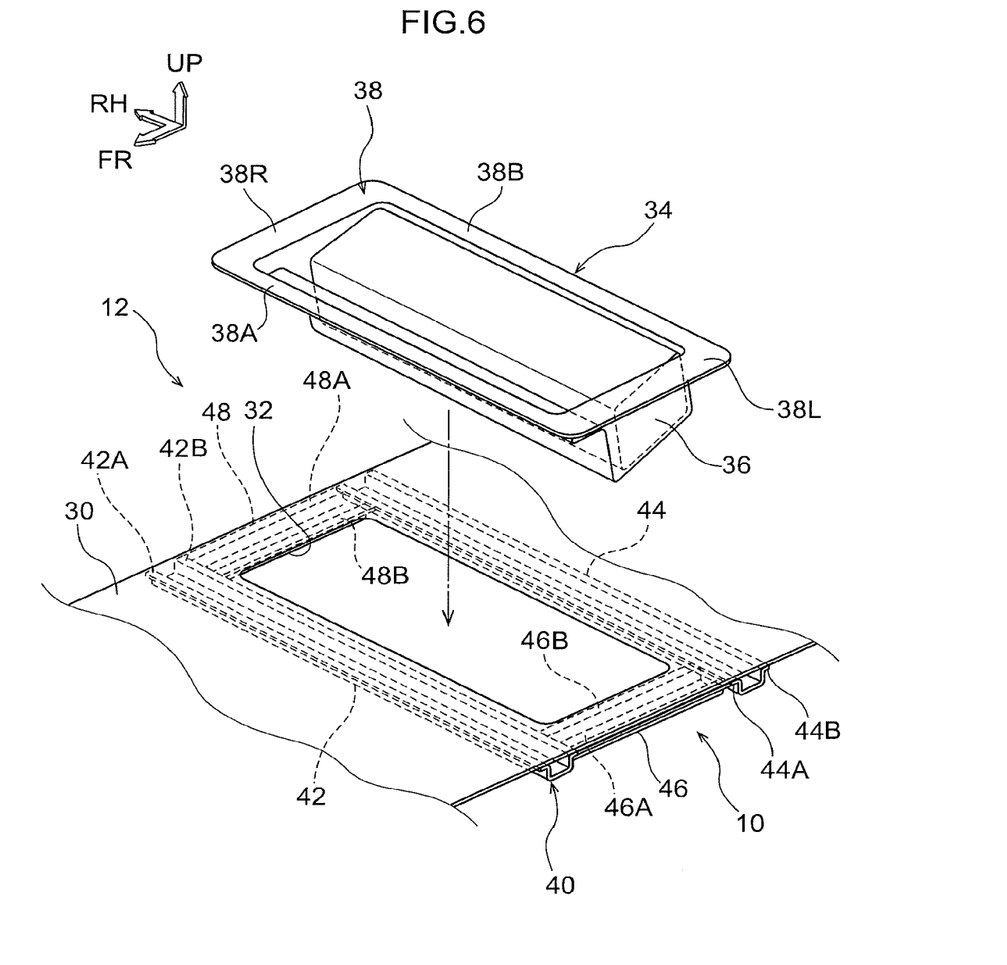
FIG. 6 is a perspective view showing a body frame that structures the framework structure of the body-on-frame vehicle in accordance with the exemplary embodiment and an HV (Hybrid Vehicle) battery.

As shown in FIG. 2, FIG. 4 and FIG. 5, a floor panel 30 in a substantially flat board shape is disposed at the vehicle upper side of at least the cross-members 24 (see FIG. 1), the first cross-member 26 and the second cross-member 28. As shown in FIG. 6, an aperture portion 32 is formed in a substantially rectangular shape in plan view at a rear side of the floor panel 30. A length of the aperture portion 32 in the vehicle width direction is longer than a length of the aperture portion 32 in the vehicle front-and-rear direction.

As shown in FIG. 4 to FIG. 6, a body framework 40 (a second framework) is disposed at surroundings of the aperture portion 32a and is joined to a lower face of the floor panel 30 so as to form a chamber shape. The body framework 40 is structured in a substantially rectangular frame shape and is provided around the aperture portion 32 in plan view. The body framework 40 includes a front cross portion 42, a rear cross portion 44, and a pair of left side cross portion 46 and a right side cross portion 48. The front cross portion 42 and the rear cross portion 44 extend in the vehicle width direction at the front and rear of the aperture portion 32. The left side cross portion 46 and right side cross portion 48 extend in the vehicle front-and-rear direction at the two vehicle width direction sides of the aperture portion 32.

The front cross portion 42, the rear cross portion 44, the left side cross portion 46 and the right side cross portion 48 are respectively formed in substantial hat shapes in cross section. A flange 42A at the vehicle body front side and a flange 42B at the vehicle body rear side of the front cross portion 42, a flange 44A at the vehicle body front side and a flange 44B at the vehicle body rear side of the rear cross portion 44, a flange 46A at the vehicle body outer side and a flange 46B at the vehicle body inner side of the left side cross portion 46, and flange 48A at the vehicle body outer sides and flange 48B at the vehicle body inner side of the right side cross portion 48 are all joined to the lower face of the floor panel 30 by spot welding or the like.

A box-shaped accommodation member 34 for accommodating the HV battery 70 is inserted into the aperture portion 32 of the floor panel 30 from a vehicle body upper side and disposed therein. The accommodation member 34 includes an accommodation portion main body 36 and a flange 38. The accommodation portion main body 36 is formed in a box shape of which the vehicle body upper side is open. At least an upper periphery portion of the accommodation member 34 is substantially the same size as the aperture portion 32. The flange 38 projects towards outer sides from the upper periphery portion of the accommodation portion main body 36. That is, the flange 38 projects to the vehicle body front side, the vehicle body rear side, and the vehicle width direction outer sides.

As shown in FIG. 4, a flange 38A that projects to the vehicle body front side is fastened and fixed by bolts 66 and weld nuts 68 to the flange 42B at the vehicle body rear side of the front cross portion 42, and a flange 38B that projects to the vehicle body rear side is fastened and fixed by the bolts 66 and weld nuts 68 to the flange 44A at the vehicle body front side of the rear cross portion 44.

As shown in FIG. 5, a flange 38L that projects to a vehicle width direction outer side, more specifically the left side, is fastened and fixed by the bolts 66 and weld nuts 68 to the flange 46A at the vehicle width direction outer side of the left side cross portion 46, and a flange 38R that projects to the right side is fastened and fixed by the bolts 66 and weld nuts 68 to the flange 48A at the vehicle width direction outer side of the right side cross portion 48.

Figure 3:
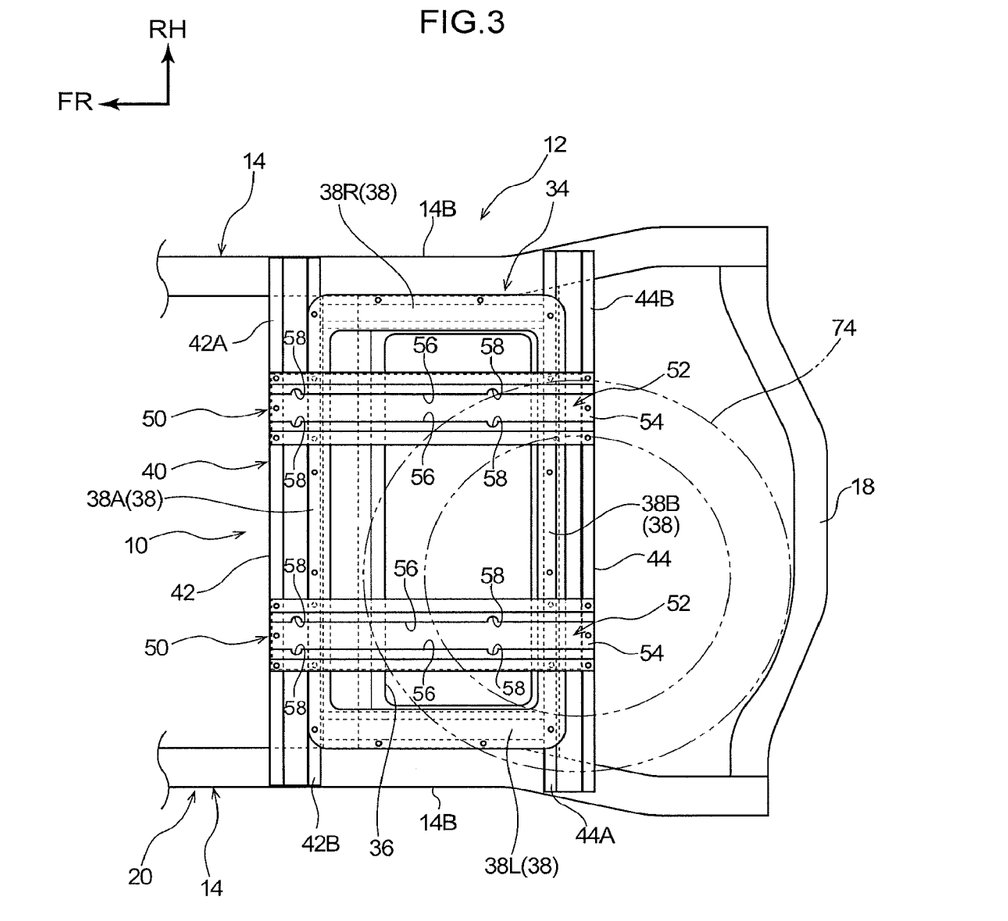
FIG. 3 is a plan view showing a magnification of principal portions of the framework structure of the body-on-frame vehicle in accordance with the exemplary embodiment.

That is, as shown in FIG. 3 (the floor panel 30 is not shown in FIG. 3), plural penetrating holes for bolt insertion are formed at appropriate locations of each of the flanges 38A, 38B, 38L and 38R and appropriate locations of each of the flanges 42B, 44A, 46A and 48A. The weld nuts 68 (see FIG. 4 and FIG. 5) are provided in advance, to be coaxial with the respective penetrating holes, at lower faces of the flanges 42B, 44A, 46A and 48A.

As shown in FIG. 2 and FIG. 4, a lower portion of the accommodation portion main body 36 of the accommodation member 34 is disposed in a cavity that is surrounded by the first cross-member 26, second cross-member 28 and a pair of left and right side rails 14 structuring the framework 20. An upper portion of the accommodation portion main body 36 is disposed in a cavity surrounded by the front cross portion 42, rear cross portion 44, left side cross portion 46 and right side cross portion 48 structuring the body framework 40.

The HV battery 70 has a volume slightly smaller than the capacity of an interior cavity of the accommodation portion main body 36 of the accommodation member 34. The HV battery 70 is accommodated inside the accommodation portion main body 36. Thus, a structure is formed in which the HV battery 70 is disposed in a cavity surrounded by the framework 20 and the body framework 40.

As shown in FIG. 1 to FIG. 4, a spare tire 74 is disposed at a vehicle body lower side of the accommodation portion main body 36. The spare tire 74 is disposed at an angle in a side view seen in the vehicle width direction, such that a vehicle body front side of the spare tire 74 is lower and the vehicle body rear side thereof is higher. Accordingly, the accommodation portion main body 36 shown in the drawings is formed such that the vehicle body front side thereof is deeper and the vehicle body rear side is shallower, and the HV battery 70 is arranged in a forward-tilted attitude. However, the spare tire 74 and the HV battery 70 may be arranged in horizontal attitudes; the shape of the accommodation portion main body 36 is not limited to the shape shown in the drawings.

As shown in FIG. 1 to FIG. 5, at vehicle width direction inner sides relative to the left side cross portion 46 and right side cross portion 48, the front cross portion 42 and rear cross portion 44 are linked together by a pair of left and right braces 50, which extend in the vehicle body front-and-rear direction and are disposed to be spaced apart in the vehicle width direction.

That is, front end portions of the braces 50 are fastened and fixed to the flange 42A at the vehicle body front side of the front cross portion 42 by the bolts 66 and weld nuts 68, and rear end portions of the braces 50 are fastened and fixed to the flange 44B at the vehicle body rear side of the rear cross portion 44 by the bolts 66 and weld nuts 68. (see FIG. 4).

Figure 7:
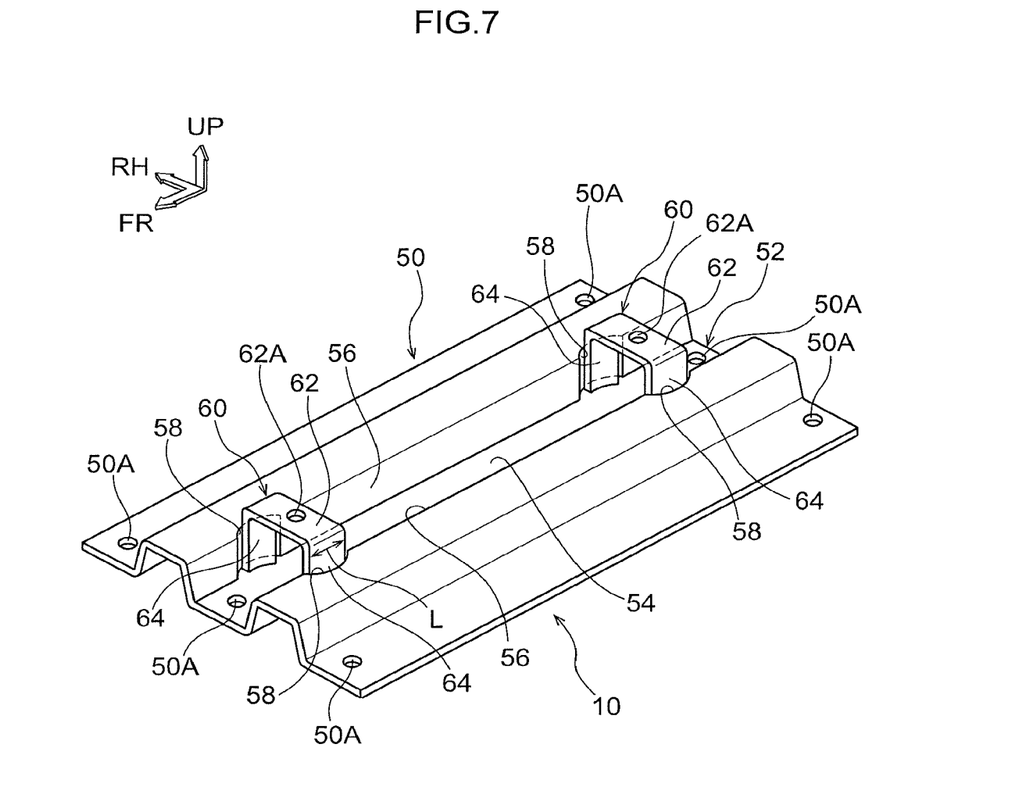
FIG. 7 is a perspective view showing a brace and seat mounting portions that structure the framework structure of the body-on-frame vehicle in accordance with the exemplary embodiment.

Therefore, as shown in FIG. 7, plural penetrating holes 50A for bolt insertion are formed at appropriate locations of the respective front end portions and rear end portions of the braces 50. Respective penetrating holes for bolt insertion are also formed at appropriate locations of the flange 42A and the flange 44B.

As shown in FIG. 3, FIG. 5 and FIG. 7, each brace 50 includes a gutter portion 52 that extends in the vehicle body front-and-rear direction at a vehicle width direction central portion of the brace 50. The gutter portion 52 is formed with a floor face 54 and left and right side faces 56. A pair of front and rear seat mounting portions 60 is provided at the two sides in the vehicle body front-and-rear direction of the gutter portion 52. The seat mounting portions 60 are for mounting a third seat 72, which is a third row of three rows of seats.

To describe this in more detail, as shown in FIG. 7, in a front view seen in the vehicle body front-and-rear direction, each seat mounting portion 60 is formed substantially in an inverted "U" shape. The seat mounting portion 60 includes a support portion 62 and a pair of left and right legs 64. The support portion 62 is formed in a rectangular flat plate shape, a length direction of which is in the vehicle width direction. The legs 64 depend integrally from both of left and right ends of the support portion 62.

A penetrating hole 62A is formed in a central portion of the support portion 62. One of the bolts 66 is inserted through the penetrating hole 62A for mounting of the third seat 72 (see FIG. 5). A spacing D of the legs 64 in the vehicle width direction (see FIG. 5) is made greater than a length (width) W of the floor face 54 of the gutter portion 52 in the vehicle width direction (see FIG. 5). Accordingly, pairs of left and right recesses 58 are formed at both sides in the vehicle body front-and-rear direction of the side faces 56 of the gutter portion 52. The recess portions 58 serve as position regulation portions into which the legs 64 of the respective seat mounting portions 60 are inserted.

As shown in FIG. 3 and FIG. 7, each pair of left and right recesses 58 is formed in substantially semicircular arc shapes in plan view, with diameters slightly larger than a length (width) L of the legs 64 in the vehicle body front-and-rear direction (see FIG. 7). The recesses 58 are formed to oppose one another in the vehicle width direction. The position of each seat mounting portion 60 in the vehicle body front-and-rear direction is regulated by the legs 64 of the seat mounting portion 60 being inserted into the pair of left and right recesses 58. Thus, the seat mounting portion 60 is positioned when the seat mounting portion 60 is welded to the brace 50.

Now, operations of the framework structure 10 of the body-on-frame vehicle 12 according to the present exemplary embodiment with the structure described above are described.

As described above, the lower portion of the HV battery 70 is disposed in the cavity surrounded by the pair of left and right side rails 14, first cross-member 26 and second cross-member 28, structuring the framework 20. The upper portion of the HV battery 70 is disposed in the cavity surrounded by the front cross portion 42, rear cross portion 44, left side cross portion 46 and right side cross portion 48 structuring the body framework 40.

Therefore, a collision load that is applied from a vehicle width direction outer side when the body-on-frame vehicle 12 is subjected to a side impact is efficiently absorbed by the first cross-member 26 and second cross-member 28 via the side rails 14 or is efficiently transmitted to the opposite sides of the first cross-member 26 and second cross-member 28 from the side at which the impact occurs, and is also efficiently absorbed by the front cross portion 42 and rear cross portion 44 or is efficiently transmitted to the opposite sides of the front cross portion 42 and rear cross portion 44 from the side at which the impact occurs. Thus, transmission of the collision load to the HV battery 70 may be reduced or prevented.

A collision load that is applied from the vehicle body forward side when the body-on-frame vehicle 12 is subjected to a frontal collision or a collision load that is applied from the vehicle body rear side when the body-on-frame vehicle 12 is subjected to a rear face collision is efficiently absorbed by the side rails 14 via the front bumper reinforcement 16 or rear bumper reinforcement 18, respectively, or is efficiently transmitted to the opposite sides of the side rails 14 from the side at which the impact occurs, and is also efficiently absorbed by the left side cross portion 46 and right side cross portion 48 or is efficiently transmitted to the opposite sides of the left side cross portion 46 and right side cross portion 48 from the side at which the impact occurs. Thus, transmission of the collision load to the HV battery 70 may be reduced or prevented.

That is, according to the framework structure 10 equipped with the framework 20 and body framework 40 according to the present embodiment, in the body-on-frame vehicle 12 in which the HV battery 70 is installed, the HV battery 70 may be protected from a collision load which is applied in the vehicle body front-and-rear direction or in the vehicle width direction.

The pair of left and right braces 50 extending in the vehicle body front-and-rear direction span between the front cross portion 42 and rear cross portion 44 of the body framework 40, and the gutter portion 52 extending in the vehicle body front-and-rear direction is formed in each brace 50. Thus, strength of the brace 50 may be improved and load withstand performance with respect to loads applied in the vehicle body front-and-rear direction may be improved.

Therefore, particularly a collision load applied in the vehicle body front-and-rear direction is more efficiently absorbed by the braces 50 or efficiently transmitted to the opposite sides of the braces 50 from the side at which the collision occurs. Thus, body deformation at a rear portion side of the body-on-frame vehicle 12 may be reduced or prevented. That is, because the braces 50 are provided, the HV battery 70 may be more reliably protected, particularly against a collision load applied in the vehicle body front-and-rear direction, and driving performance of the body-on-frame vehicle 12 may be improved.

Moreover, because the HV battery 70 is protected by the framework 20 as well as the body framework 40, a collision load applied to the body framework 40 may be moderated compared to a structure in which the HV battery 70 is protected only by the body framework 40. Therefore, the weight of the body framework 40 may be reduced.

Because the front cross portion 42, rear cross portion 44, left side cross portion 46 and right side cross portion 48 are formed into the chamber shape by each being joined to the lower face of the floor panel 30, joins for formation of the chamber shape may be made simpler and weight may be reduced.

Because the seat mounting portions 60 for mounting the third seat 72 are provided at the braces 50 at which the gutter portions 52 are formed and whose strength is improved, there is no need to separately provide high-strength members for mounting of the seat mounting portions 60. Thus, the number of components may be reduced. Therefore, the body-on-frame vehicle 12 may be reduced in weight.

The recess portions 58 that regulate the positions of the seat mounting portions 60 in the vehicle body front-and-rear direction are formed at the side faces 56 of the gutter portions 52 of the braces 50. Therefore, load withstand performance with respect to loads applied to the seat mounting portions 60 in the vehicle body front-and-rear direction may be improved with a simple structure, and the seat mounting portions 60 may be made less likely to disengage from the gutter portions 52 of the braces 50.

The accommodation member 34 in which the HV battery 70 is accommodated is inserted into the aperture portion 32 formed in the floor panel 30 and is disposed at the rear side of the body-on-frame vehicle 12, that is, at the lower side of the third seat 72. Thus, dead space at the vehicle body rear side relative to a fuel tank (not shown in the drawings)—which is disposed at the lower side of a second seat (not shown in the drawings) that is a second row of the three rows of seats may be utilized effectively as a space for disposing the HV battery 70.

Because the aperture portion 32 is formed in the rear side of the floor panel 30 and the accommodation member 34 is disposed therein, weight of the floor panel 30 may be reduced by an amount corresponding to the formation of the aperture portion 32. Therefore, the body-on-frame vehicle 12 may be even further reduced in weight.

Hereabove, the framework structure 10 of the body-on-frame vehicle 12 according to the present exemplary embodiment has been described in accordance with the attached drawings. However, the framework structure 10 of the body-on-frame vehicle 12 according to the present exemplary embodiment is not limited to the illustrated structure; suitable design modifications may be applied within a scope not departing from the claimed invention. For example, the front cross portion 42, rear cross portion 44, left side cross portion 46 and right side cross portion 48 structuring the body framework 40 may each be joined to an upper face of the floor panel 30.

Although the accommodation member 34 shown in the drawings is a separate body from the floor panel 30, this is not limiting. Structures are possible in which the accommodation portion main body 36 of the accommodation member 34 is integrally formed with the rear side of the floor panel 30. Further, although the battery shown in the drawings is the HV battery 70, the battery is not limited thus. For example, the framework structure 10 according to the present exemplary embodiment may be applied to a battery for an electric vehicle, a battery for a fuel cell vehicle or the like.

Position regulation portions are not limited to the recesses 58. For example, provided the spacing D of the legs 64 is not more than the width W of the floor face 54 of each gutter portion 52, pairs of front and rear projection portions (not shown in the drawings) may be projected into the gutter portion 52 in plan view and regulate positions of the legs 64 of each seat mounting portion 60 from both front and rear sides.

What is claimed is:

1. A framework structure of a body-on-frame vehicle, the framework structure comprising:
    a first framework, a second framework, a battery, and a floor panel,
    the first framework including:
        a pair of left and right side rails extending in a vehicle body front-and-rear direction,
        a first cross-member extending in a vehicle body left-and-right direction and linking the side rails, and
        a second cross-member extending in the vehicle body left-and-right direction at a vehicle body rear side of the first cross-member and linking the side rails;
    the second framework being structured in a rectangular shape in plan view and including:
        a front cross portion and a rear cross portion that are formed in chamber shapes and extend in the vehicle body left-and-right direction, and
        a left side cross portion and a right side cross portion that are formed in chamber shapes and extend in the vehicle body front-and-rear direction;
    the floor panel disposed at a vehicle body upper side of the first cross-member and the second cross-member, the floor panel including an aperture portion and the second framework surrounds the aperture portion in plan view,
    the battery being disposed in a cavity surrounded by the first framework and the second framework; and
    the battery is accommodated in an accommodation portion that is inserted in the aperture portion, the accommodation portion including a flange that is attached to the second framework.

2. The framework structure of a body-on-frame vehicle according to claim 1,
    wherein the front cross portion, the rear cross portion, the left side cross portion, and the right side cross portion are formed into the chamber shapes by each being joined to the floor panel.

3. A framework structure of a body-on-frame vehicle, the framework structure comprising:
    a first framework, a second framework, and a battery,
    the first framework including:
        a pair of left and right side rails extending in a vehicle body front-and-rear direction,
        a first cross-member extending in a vehicle body left-and-right direction and linking the side rails, and
        a second cross-member extending in the vehicle body left-and-right direction at a vehicle body rear side of the first cross-member and linking the side rails;
    the second framework being structured in a rectangular shape in plan view and including:
        a front cross portion and a rear cross portion that are formed in chamber shapes and extend in the vehicle body left-and-right direction, and
        a left side cross portion and a right side cross portion that are formed in chamber shapes and extend in the vehicle body front-and-rear direction;
    the battery being disposed in a cavity surrounded by the first framework and the second framework,
    the front cross portion and the rear cross portion are linked together, at vehicle body left-and-right direction inner sides relative to the left side cross portion and the right side cross portion, by a pair of left and right braces that extend in the vehicle body front-and-rear direction, and
    a gutter portion that extends in the vehicle body front-and-rear direction is formed at each of the left and right braces.

4. The framework structure of a body-on-frame vehicle according to claim 3, wherein seat mounting portions that are configured to mount a seat are provided at the pair of left and right braces.

5. The framework structure of a body-on-frame vehicle according to claim 4, wherein:
    the gutter portions of the left and right braces are each formed by a floor face and side faces, and
    position regulation portions that regulate positions of the seat mounting portions in the vehicle body front-and-rear direction are formed at the side faces.

* * * * *